United States Patent
Simchak et al.

(10) Patent No.: US 11,092,304 B2
(45) Date of Patent: Aug. 17, 2021

(54) VEHICLE ADAPTABLE DRIVING BEAM HEADLAMP

(71) Applicant: Flex-N-Gate Advanced Product Development, LLC, Tecumseh (CA)

(72) Inventors: Jeffrey Simchak, Dexter, MI (US); David Bjarne Hansen, Grand Rapids, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/561,640

(22) Filed: Sep. 5, 2019

(65) Prior Publication Data

US 2020/0072428 A1    Mar. 5, 2020

Related U.S. Application Data

(60) Provisional application No. 62/727,087, filed on Sep. 5, 2018.

(51) Int. Cl.
*F21S 41/148* (2018.01)
*B60Q 1/08* (2006.01)
(Continued)

(52) U.S. Cl.
CPC .............. *F21S 41/148* (2018.01); *B60Q 1/08* (2013.01); *F21S 41/153* (2018.01); *F21S 41/275* (2018.01)

(58) Field of Classification Search
CPC . B60Q 1/08; F21S 41/24; F21S 41/143; F21S 41/663; F21S 41/151; F21S 41/153; F21S 41/331; F21S 41/36; F21S 41/33
See application file for complete search history.

(56) References Cited

U.S. PATENT DOCUMENTS

| | | | |
|---|---|---|---|
| 5,143,445 A | 9/1992 | Bateman et al. | |
| 10,139,068 B2 * | 11/2018 | Plank | F21S 41/65 |

(Continued)

FOREIGN PATENT DOCUMENTS

| | | |
|---|---|---|
| AT | 513738 A1 | 7/2014 |
| DE | 102008013603 A1 | 9/2009 |

(Continued)

OTHER PUBLICATIONS

PCT Patent Application PCT/US2019/055582 International Search Report and Written Opinion dated Jan. 15, 2020.

(Continued)

*Primary Examiner* — Matthew J. Peerce
(74) *Attorney, Agent, or Firm* — Erise IP, P.A.

(57) ABSTRACT

An adaptable-driving-beam headlamp for a vehicle includes a plurality of light-emitting diodes (LEDs) mounted on one or more printed circuit boards. An inner lens assembly has a plurality of discrete sub-lenses. Each discrete sub-lens of the inner lens assembly is aligned with a respective one of the plurality of LEDs for shaping emitted light. An outer lens is adapted to receive light from the inner lens assembly and project the light from the vehicle. A camera system for imaging a forward view from the vehicle. A controller is adapted for determining a target location based images received from the camera system such that dimming of one or more LEDs via the controller reduces glare from the vehicle adaptable-driving-beam headlamp as perceived at the target location.

14 Claims, 11 Drawing Sheets

(51) Int. Cl.
F21S 41/275 (2018.01)
F21S 41/153 (2018.01)

(56) References Cited

U.S. PATENT DOCUMENTS

| | | | |
|---|---|---|---|
| 10,208,912 B2* | 2/2019 | Taudt | F21S 41/25 |
| 10,443,790 B2 | 10/2019 | George et al. | |
| 2014/0204602 A1* | 7/2014 | Jungwirth | F21S 41/43 |
| | | | 362/521 |
| 2015/0226395 A1 | 8/2015 | Taudt et al. | |
| 2015/0192264 A1 | 9/2015 | Holzl et al. | |
| 2016/0288699 A1 | 10/2016 | Solar et al. | |
| 2017/0314759 A1 | 11/2017 | Nykerk et al. | |
| 2018/0252403 A1 | 9/2018 | Hamid et al. | |
| 2018/0274745 A1 | 9/2018 | Nykerk et al. | |
| 2019/0309924 A1 | 10/2019 | Nykerk et al. | |

FOREIGN PATENT DOCUMENTS

| | | |
|---|---|---|
| DE | 102017129254 A1 | 7/2018 |
| EP | 0167092 A2 | 6/1985 |
| EP | 2306074 A2 | 4/2011 |

OTHER PUBLICATIONS

PCT Patent Application PCT/US2019/049703 International Search Report and Written Opinion dated Mar. 5, 2020.

* cited by examiner

VEHICLE ADAPTABLE DRIVING BEAM HEADLAMP

CROSS-REFERENCE TO RELATED APPLICATIONS

This application claims the benefit of U.S. Provisional Application No. 62/727,087 entitled "Vehicle Adaptable Driving Beam Headlamp" and filed on Sep. 5, 2018, which is herein incorporated by reference in its entirety.

BACKGROUND

1. Field of the Disclosure

Embodiments of this disclosure relate generally to the field of headlamp assemblies for use in vehicles. More specifically, embodiments of this disclosure relate to adaptable-driving-beam (ADB) headlamps.

2. Description of the Related Art

Many types of adaptable headlamps for vehicles are described in the prior art. For example, U.S. Pat. No. 9,476,558 to Stefanov et al. discloses numerous primary lens elements disposed in a matrix. U.S. Pat. No. 9,188,299 to Fiederling et al. discloses a plurality of LEDs and a plurality of optical waveguides aligned with the LEDs for directing light to a planoconvex optical lens. U.S. Pat. No. 8,801,242 to Hamm et al. discloses a light module for a vehicular lamp that generates a plurality of stripe-shaped segments of a high-beam light distribution. U.S. Patent Publication 2015/0192264 to Holzl et al. discloses a vehicle headlight having a plurality of LEDs and a corresponding plurality of light guides. U.S. Pat. No. 9,618,174 to Jungwirth et al. discloses an adaptable vehicle headlight with an array of LED light sources, an array of corresponding primary optical elements, and secondary optical elements.

SUMMARY

A vehicle adaptable-driving-beam headlamp includes an inner lens assembly having a plurality of discrete sub-lenses for shaping light and a plurality of light-emitting diodes (LEDs). Each one of the plurality of LEDs is aligned with a respective discrete sub-lens of the inner lens assembly. An outer lens is adapted to receive light from the inner lens assembly and project the light outward from the vehicle adaptable-driving-beam headlamp. A controller is adapted for dimming one or more LEDs for selectively dimming portions of the vehicle adaptable-driving-beam headlamp.

An adaptable-driving-beam headlamp for a vehicle includes a plurality of light-emitting diodes (LEDs) mounted on one or more printed circuit boards. An inner lens assembly has a plurality of inner lenses. Each inner lens of the inner lens assembly is aligned with a respective one of the plurality of LEDs for shaping emitted light. An outer projection lens is adapted to receive light from the inner lens assembly and project the light from the vehicle. A camera system for imaging a forward view from the vehicle. A controller is adapted for determining a target location based images received from the camera system such that dimming of one or more LEDs via the controller reduces glare from the vehicle adaptable-driving-beam headlamp as perceived at the target location.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include an adaptable-driving-beam (ADB) headlamp for a vehicle that provides a means to adaptively dim or turn off portions of the headlamp while driving for the purpose of reducing glare as perceived by someone outside the vehicle (e.g., an occupant of another vehicle or a pedestrian).

Figure 1:
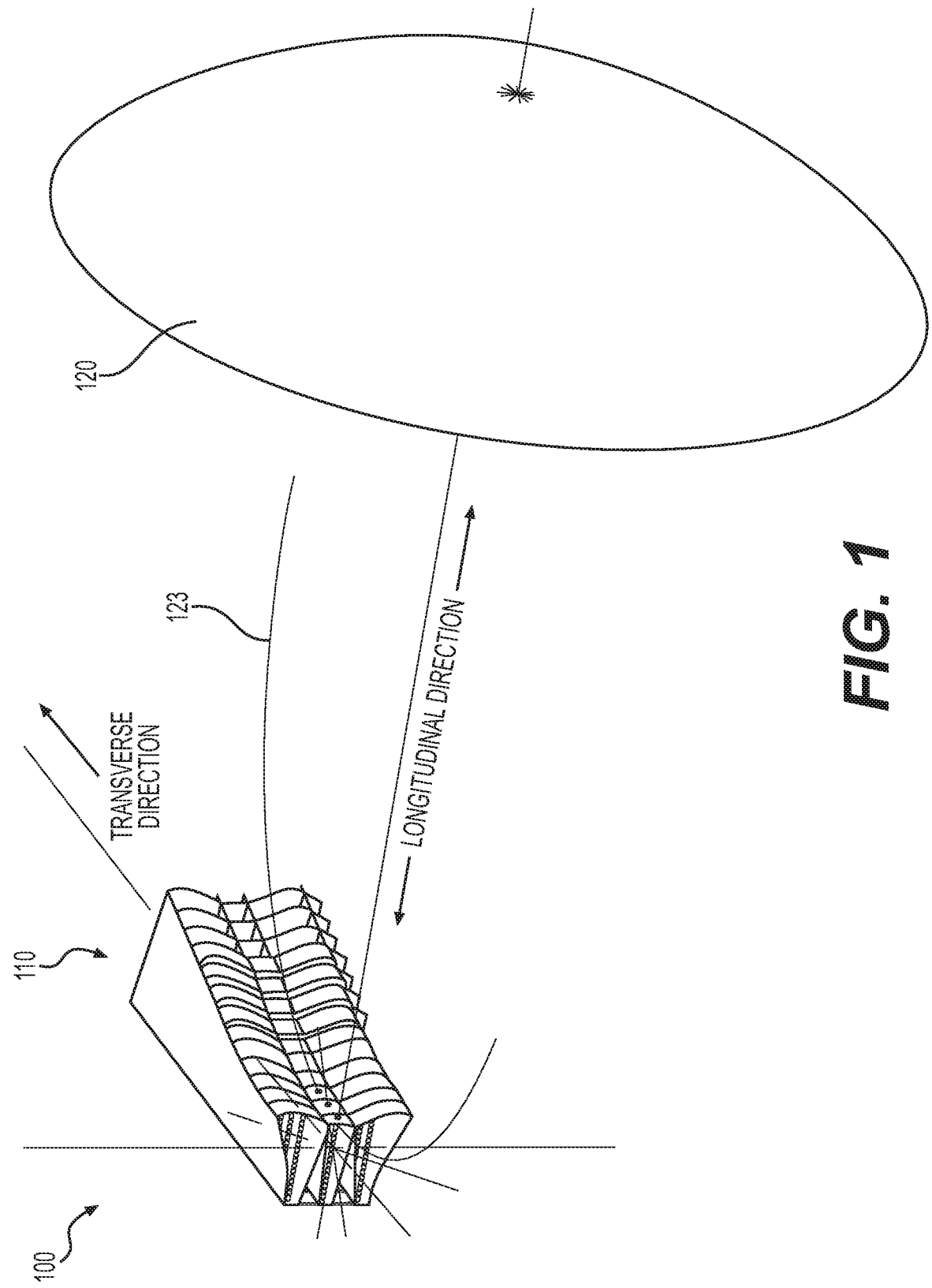
FIG. 1 is a perspective view of an inner lens assembly aligned with an outer lens of a vehicle adaptable-driving-beam (ADB) headlamp, in an embodiment.

FIG. 1 is a perspective view of an exemplary inner lens assembly 110 aligned with an outer lens 120 of a vehicle ADB headlamp 100. ADB headlamp 100 is for example located on a forward-facing portion of a vehicle for illuminating an area ahead of the vehicle during low ambient-lighting conditions (e.g., at night). ADB headlamp 100 may include additional components not depicted in FIG. 1 for clarity of illustration. For example, light-emitting diodes (LEDs) may be used as light sources for ADB headlamp 100, either exclusively or in combination with other types of lamps. The LEDs are arranged in an array or matrix, with the arrangement being configured for enabling adaptable dimming functions of ADB headlamp 100.

In certain embodiments, a plurality of LEDs are mounted to one or more printed circuit boards (PCBs) adapted for individually controlling the LEDs (e.g., PCB 105 in FIGS. 4-11). Each LED is aligned with a corresponding inner lens of inner lens assembly 110. Light emitted from each LED is projected through its aligned inner lens, which shapes the light emitted from the LED. A coupling surface (e.g., an input surface) of each inner lens receives light emitted from its respective LED. In some embodiments, the coupling surface is larger than the LED emitting surface. Each inner lens is a total-internal-reflection and collimation type lens that includes optic elements centered over a respective LED. In certain embodiments, the inner lenses are silicone finger-type lenses or plastic finger-type lenses.

A mechanical frame or molded carrier may be used to hold the inner lenses in place for forming inner lens assembly 110. The inner lenses are arranged close to one another to avoid an optical gap between inner lenses. In some embodiments, the inner lenses are molded together.

Inner lens assembly 110 includes a plurality of discrete sub-lenses that collectively project a beam pattern in front of a vehicle. Because each LED is addressable via PCB 105, dimming or turning off segments of the beam pattern is facilitated for preventing glare as perceived by other vehicle occupants or pedestrians, as further described below.

In operation, the LEDs and discrete sub-lenses of inner lens assembly 110 form an overall beam pattern of ADB headlamp 100. By dimming or turning off individual LEDs, ADB headlamp 100 may be used to avoid glare perceived by occupants of other vehicles and pedestrians. For example, a camera system may be used to image a forward view, and a controller may be used to determine which LEDs to modulate or turn off in real-time or near real-time based on images received from the camera. For example, the controller may dim certain LEDs using pulse-width modulation based on a target location determined from the camera images. In addition to a camera, a GPS module may be used for determining a location of the vehicle and providing location information to the controller. In certain embodiments, other sensing methods may be used to determine target locations by the controller for determining which LEDs to turn off or modulate, such as RADAR, LIDAR, and thermal sensors. In some embodiments, a direction of the overall beam pattern or a hot spot of the beam pattern may be adaptively altered by adjusting which LEDs are illuminated. For example, when the vehicle is turning, LEDs aligned in the direction of the turn may be illuminated while LEDs aligned away from the direction of the turn may be turned off or dimmed.

The controller is for example a headlamp control module having a computer, a microcontroller, a microprocessor, or a programmable logic controller (PLC) located onboard the vehicle and communicatively coupled with the LED matrices via one or more PCBs (e.g., PCB 105). None, some, or all of the controller circuitry may be located on the PCB 105 versus on a separate PCB. The controller includes a memory, including a non-transitory medium for storing software, and a processor for executing instructions of the software. The memory may be used to store information used by the controller, including but not limited to algorithms, lookup tables, and computational models. The controller may include one or more switches (e.g., for performing pulse-width modulation). Communication between the controller and the LED circuit boards may be by one of a wired and/or wireless communication media.

Figure 3:
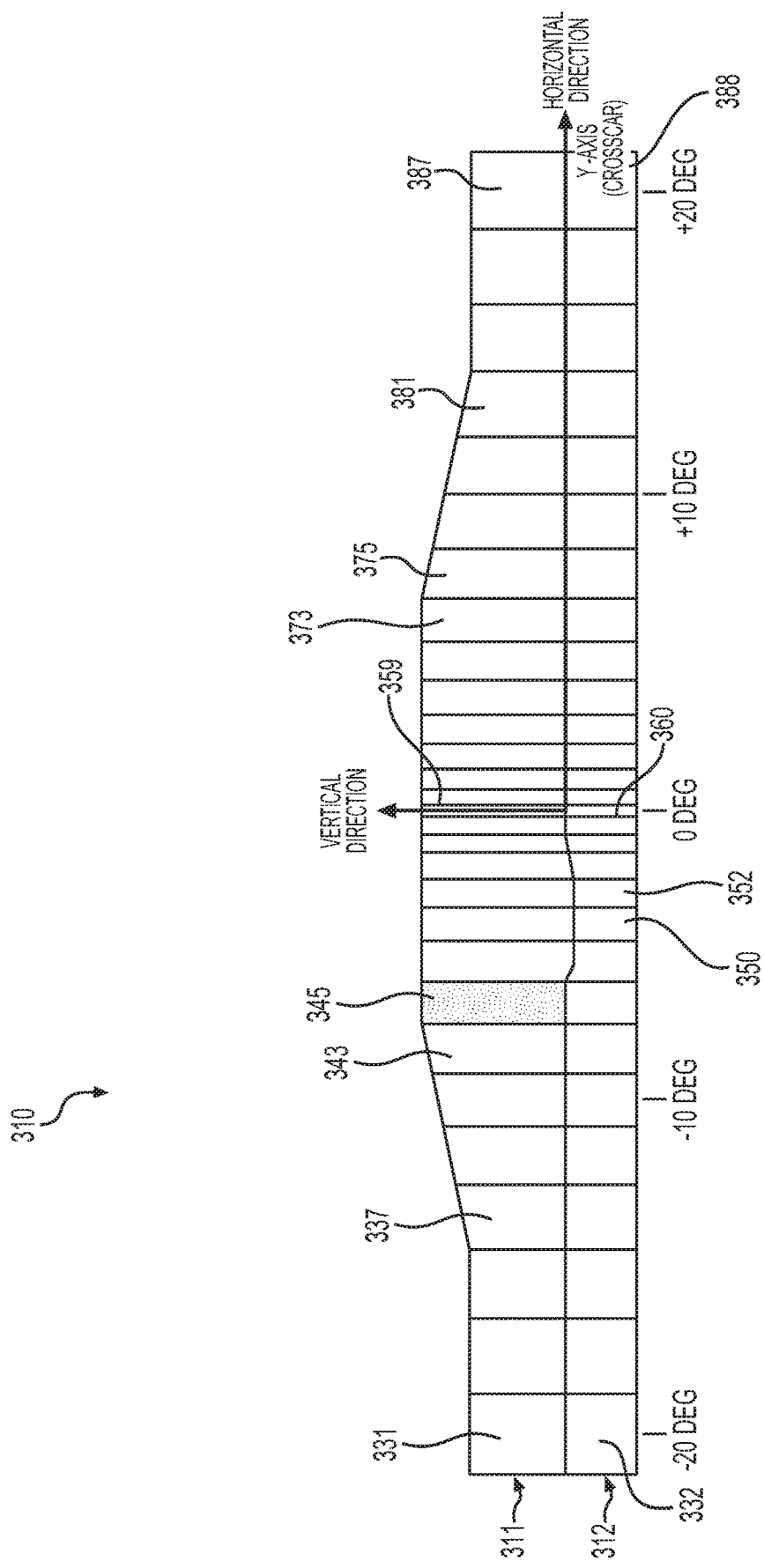
FIG. 3 is a beam pattern from a vehicle ADB headlamp, in an embodiment.

As depicted in FIG. 1, a longitudinal direction is in the general direction of light projection (e.g., in the direction of travel along a road, or "straight ahead"). As depicted in FIG. 3, a horizontal direction (e.g., "cross-car") is perpendicular to the longitudinal direction, and a vertical direction is an up/down direction that is perpendicular to the horizontal and longitudinal directions.

In certain embodiments, inner lens assembly 110 is configured for shaping light in the horizontal (e.g., cross-car) and vertical (e.g., up/down) directions. For example, each lens of inner lens assembly 110 may be adapted for collimating light in the horizontal and/or vertical directions. Collimated light is light whose rays are parallel, and therefore will spread minimally as it propagates. In another example, shaping the light may include smoothing light from individual LEDs so that the overall beam pattern appears as one homogenous light source as opposed to a series of discrete light sources. In other words, an inner lens may spread light emitted from its respective LED (e.g., horizontally and/or vertically) and blend the light with that emitted from a neighboring inner lens.

An outer lens 120 is a projection lens that receives light from inner lens assembly 110 and projects the light along the longitudinal direction (e.g., in front of the vehicle). Outer lens 120 may be an undivided freeform optic surface, undivided aspheric surface, or undivided modified aspheric surface that generates one collective undivided image (e.g., in front of the vehicle) when ADB headlamp 100 is lit. In other words, only one image is projected from outer lens 120. An aspheric lens is one whose surface differs in shape from portions of a sphere or cylinder (e.g., elliptical, hyperbolic, or freeform). To improve beam image uniformity, an inner surface of outer lens 120 (e.g., the "B surface" facing inner lens assembly 110) may include pillow optics, flutes, or a swept optic surface, or it may be flat.

In certain embodiments, portions of inner lens assembly 110 are arranged along a curved line 123 which represents a focus curve of outer lens 120. In other words, portions of inner lens assembly 110 along curved line 123 (and in a 3D sphere coincident with curved line 123) will be projected in focus, whereas portions of inner lens assembly 110 off of the curved line will be blurry and out of focus. In the embodiment depicted in FIG. 1, inner portions of inner lens assembly 110 may be positioned along curved line 123 for providing a focused beam pattern directly in front of a vehicle, whereas peripheral portions of inner lens assembly 110 may intentionally be positioned off of curved line 123 for blurring the beam pattern. In other words, inner lens assembly 110 may be arranged with a curvature adapted for shaping the overall beam pattern.

In some embodiments, one or more anti-reflection coatings may be added to the exit surfaces of the inner lenses of inner lens assembly 110 and/or the exit surfaces of the outer lens 120 to improve light control efficiency.

Figure 2:
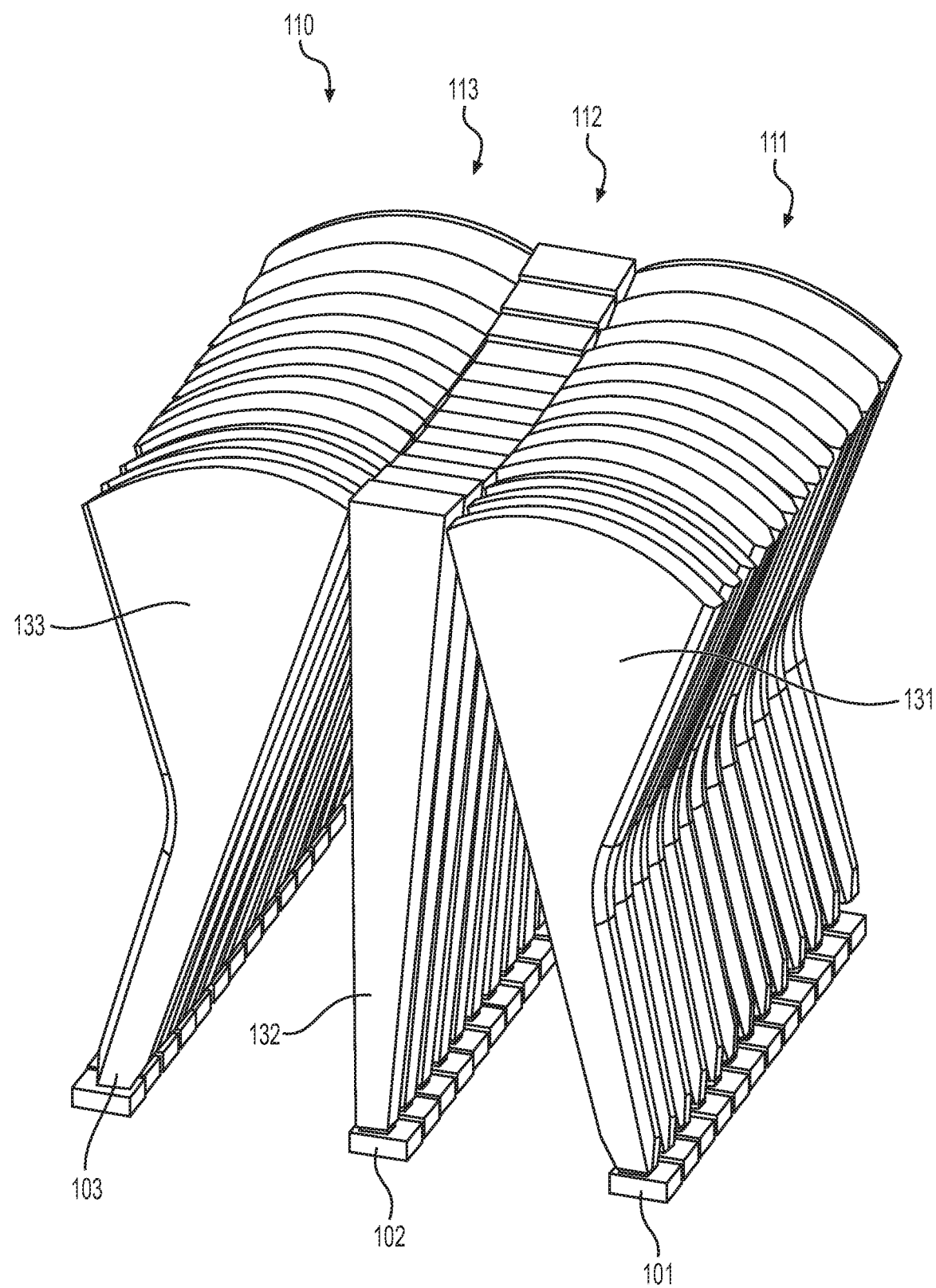
FIG. 2 is a perspective view of a portion of an inner lens assembly having a matrix of inner lenses aligned in three arrays, in an embodiment.

FIG. 2 is a perspective view of a portion of inner lens assembly 110 having a matrix of discrete sub-lenses aligned in three arrays, a first array 111, a second array 112, and a third array 113. Each of first, second, and third arrays 111, 112, 113 includes a plurality of discrete sub-lenses aligned adjacent to one another. Each of the discrete sub-lenses is an individual inner lens, which may be a finger-pipe optic having a narrow end for receiving light via a coupling (input) surface from a corresponding light source, as depicted in FIG. 2. Each of the inner lenses (i.e., discrete sub-lenses) widens along its length towards an exit area or face. For example, first array 111 includes a first inner lens 131 for receiving light from a first LED 101, second array 112 includes a second inner lens 132 for receiving light from a second LED 102, and third array 113 includes a third inner lens 133 for receiving light from a third LED 103.

The discrete sub-lenses of inner lens assembly 110 may have variable geometries. For example, as depicted in FIG. 2, first inner lens 131 and third inner lens 133 each remain narrow from the input end to about midway, then fan out toward the exit area. In contrast, second inner lens 132 widens only slightly but more consistently from its input end to its exit area. Additionally, a thickness of the inner lenses may vary. For example, towards the far end of inner lens assembly 110, as depicted in FIG. 2, the inner lenses are thicker for increasing the horizontal spread of light along the outer most portion of the beam pattern.

In some embodiments, only a single horizontal array of discrete sub-lenses is used (see e.g., FIGS. 7-11). In other embodiments, two or more horizontal arrays of discrete sub-lenses are used. In the embodiment depicted in FIG. 2, inner lens assembly 110 includes a 3×13 matrix of discrete sub-lenses. In the beam pattern depicted in FIG. 3, a 2×29 spot pattern is produced from a matrix of discrete sub-lenses. However, inner lens assembly 110 need not have an equal number of discrete sub-lenses per array. The number of LEDs and corresponding discrete sub-lenses, the arrangement of LEDs and discrete sub-lenses, and the shape of the discrete sub-lenses may be varied in different embodiments based on the illumination requirements of the headlamp and the luminance provided by the individual LEDs, among other things. For example, a higher number of LEDs increases the resolution of the adaptable light shaping capability.

FIG. 3 is an exemplary beam pattern 310 associated with a vehicle ADB headlamp. In the embodiment depicted in FIG. 3, beam pattern 310 results from an inner lens assembly 110 having a plurality of discrete sub-lenses aligned in two arrays, which produces two arrays of beam pattern spots, a first array 311 and second array 312. The first and second arrays 311, 312 of beam pattern 310 are both arranged horizontally, with first array 311 being above second array 312 in the vertical direction. For example, a beam spot 331 associated with a first inner lens 131 is aligned above a beam spot 332 associated with a second inner lens 132. Not all spots of beam pattern 310 are enumerated in FIG. 3 for clarity of illustration.

In the exemplary beam pattern 310 depicted in FIG. 3, beam spots in the first array 311 result from discrete sub-lenses that are generally taller than paired discrete sub-lenses that produce the second array 312 (e.g., first and second inner lenses 131, 132 have the same width, but first inner lens 131 is taller than second inner lens 132). In other words, an exit area and an aspect ratio of the discrete sub-lenses may be varied along different portions of the inner lens assembly 110. The exit areas and aspect ratios may be adapted for blending the light pattern and for illuminating portions of the light pattern more or less brightly (e.g., more light may be directed centrally in front of a vehicle).

Within the inner lens assembly 110, the pitch of the discrete sub-lenses may vary. In certain embodiments, inner lenses near the middle of inner lens assembly 110 are narrower than inner lenses near either end of inner lens assembly 110. In the resulting beam pattern 310, a beam pattern spot 352 associated with a twenty-second inner lens is narrower than a beam pattern spot 332 associated with second inner lens 132. Varying the pitch of the lens may be used to customize the light pattern. For example, a narrower pitch in the center may be used to provide a higher intensity and resolution in the central portion of the beam to illuminate oncoming traffic, whereas a coarser resolution may be used outside the central portion where traffic is moving faster and closer relative to the vehicle.

The profile of inner lens assembly 110 may be adapted to provide desired characteristics of beam pattern 310. In certain embodiments, the profile of first array 311 and second array 312 may be varied in the vertical direction. For example, an upper profile of first array 311 varies from left to right as follows: upwardly between a seventh beam spot 337 and a thirteenth beam spot 343; substantially horizontally between fifteenth beam spot 345 and a forty-third beam spot 373; and, downwardly between forty-fifth beam spot 375 and fifty-first beam spot 381. A taller light distribution may be provided in the central region of first array 311 as depicted in FIG. 3. An upper profile of second array 312 may be lowered in some portions, such as between twentieth beam spot 350 and twenty-second beam spot 352 due to shorter inner lenses corresponding to those beam spots. This may be used to reduce glare specifically for an oncoming driver, especially while driving over bumps and small hills.

In operation, individual LEDs may be dimmed or turned off dynamically such that ADB headlamp 100 is used to avoid glare perceived by occupants of other vehicles and pedestrians while driving. As depicted in FIG. 3, a beam spot 345 associated with a fifteenth inner lens is an example of an beam spot that is unlit by turning off its respective LED. In some embodiments, a plurality of LEDs are dimmed or turned off from one or more segments of inner lens assembly 110 to improve glare reduction. The one or more segments may be dimmed or turned off dynamically, under control of the controller, to avoid producing glare at a target location (e.g., a location of another vehicle) that is moving relative to ADB headlamp 100.

ADB headlamp 100 may be configured to provide a low-beam function, a high-beam function, or both low-beam and high-beam functions. For example, in beam pattern 310, first array 311 may be a high-beam pattern while second array 312 is a low-beam pattern. In certain embodiments, a shape of the high-beam pattern is such that a legal cutoff is maintained. For example, an aspheric outer lens 120 with a sharp cutoff in the beam shaping optic may be used for maintaining downwardly directed light towards the road and away from the eyes of occupants in nearby vehicles.

In operation, discrete sub-lenses that are centrally aligned within inner lens assembly 110 project light directly in front of ADB headlamp 100, and discrete sub-lenses aligned along the periphery of inner lens assembly 110 project light towards the sides and in front of ADB headlamp 100. In other words, central beam pattern spots of FIG. 3 (e.g., a twenty-ninth beam spot 359 and a thirtieth beam spot 360) are light projections substantially in line with the longitudinal direction (e.g., at an angle that differs from the longitudinal direction by zero degrees). Beam spots on the periphery of beam pattern 310 (e.g., first and second beam spots 331, 332 and beam spots 387, 388) project light at an angle outside of the longitudinal direction. The orientation and width of the corresponding inner lenses determines the beam pattern spread projected. As depicted in FIG. 3, the spread angle of beam pattern 310 is about twenty degrees to the left and right in the horizontal direction. In other embodiments, the beam pattern has a narrower spread angle of about twelve degrees to the left and right in the horizontal direction.

Figure 4:
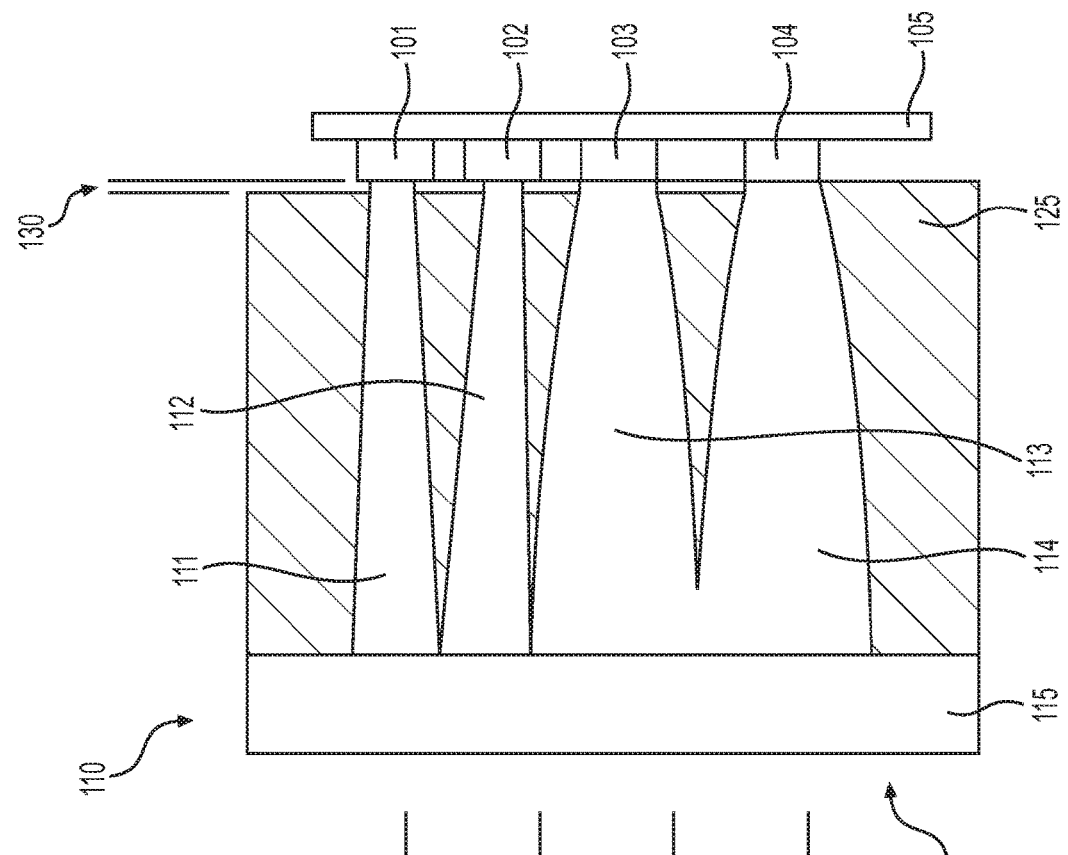
FIG. 4 is a cross-sectional side view of a vehicle ADB headlamp having four rows of inner lenses aligned vertically, in an embodiment.
Figure 4:
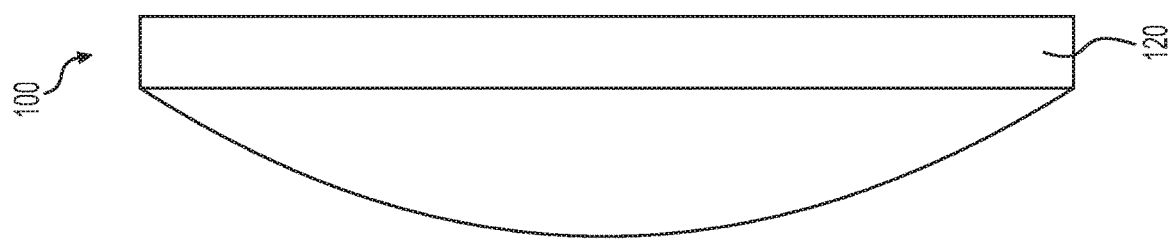

FIG. 4 is a cross-sectional side view of a vehicle ADB headlamp 100 having four rows of discrete sub-lenses aligned vertically. First inner lens 111 is aligned with first LED 101 in a top position. Second inner lens 112 is aligned with second LED 102 and positioned beneath first inner lens 111 and first LED 101, respectively. Third inner lens 113 is aligned with third LED 103 and positioned beneath second inner lens 112 and second LED 103, respectively. Fourth inner lens 114 is aligned with fourth LED 104 in a bottom position. The LEDs 101-104 are mounted to PCB 105 enabling control of each LED individually via the controller. First, second, third and fourth inner lenses 111-114 are made of a clear plastic or clear silicone material for substantially transmitting light from their respective LEDs.

Figure 5:
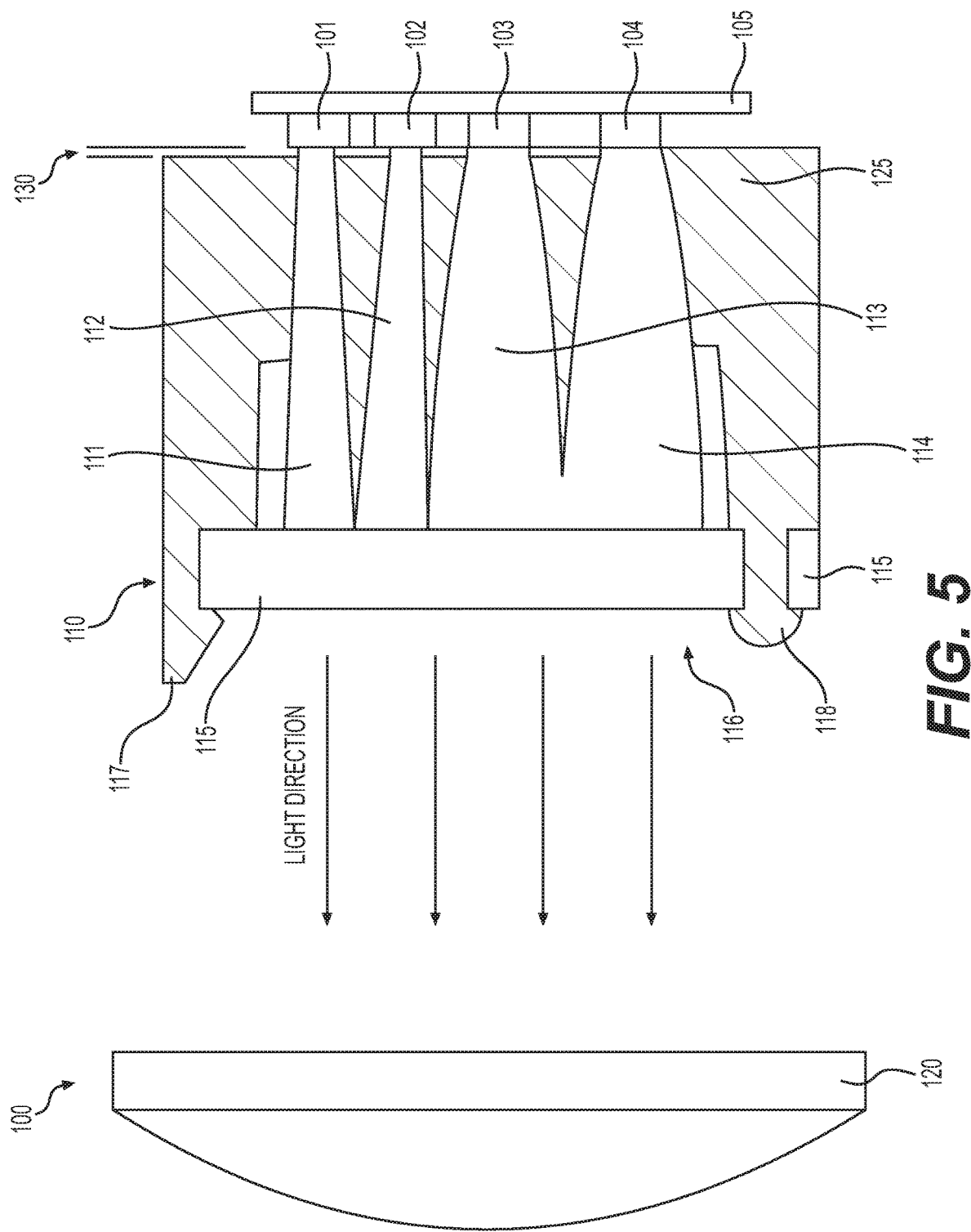
FIG. 5 is a cross-sectional side view of another embodiment of a vehicle ADB headlamp having four rows of inner lenses aligned vertically.

An inner lens face 115 is coupled to inner lenses 111-114. An output side 116 of inner lens face 115 may include pillow optics, flutes, or a swept optic surface, or it may be flat, Inner lens face 115 may be very thin (in other words, FIGS. 4 and 5 are not drawn to scale).

In certain embodiments, third inner lens 113 and fourth inner lens 114 merge together near inner lens face 115. Merged inner lenses facilitate a wider vertical beam spread compared to independent inner lenses, such as first and second inner lenses 111, 112.

Surrounding the inner lenses 111-114 is an opaque material 125 that prevents light from transferring between the inner lenses. In certain embodiments, opaque material 125 is a white plastic or white silicone material.

An optional gap 130 may be provided between LEDs 101-104 and the input side of inner lenses 111-114 for controlling alignment and positioning of inner lenses 111-114 within opaque material 125.

Inner lens assembly 110 may be a molded part formed separately from opaque material 125 or inner lens assembly 110 and opaque material 125 may be formed as a single part using a two-shot injection molding process. For example, for the embodiment depicted in FIG. 4, inner lens assembly 110 may be molded as a single part using a two-shot process, with a first injection forming inner lenses 111-114, followed by a second injection forming opaque material 125. Alternatively, inner lenses 111-114 are molded separately from opaque material 125 and held together, as further described below in connection with FIG. 5.

FIG. 5 is a cross-sectional side view of a vehicle ADB headlamp 100 having four rows of inner lenses 111-114 aligned vertically. The embodiment depicted in FIG. 5 is modified from that of FIG. 4. Specifically, opaque material 125 is formed with features adapted to hold inner lens face 115 together with opaque material 125. For example, an optional latch 117 extends over inner lens face 115 for hooking to inner lens face 115. In another example, an optional heat stake 118 extends through a gap in inner lens face 115 for securing inner lens face 115 to opaque material 125. The optional latch 117 and optional heat stake 118 allow opaque material 125 to be molded as a separate part from inner lenses 111-114 and inner lens face 115, as opposed to using a two-shot injection molding process to form a single part, as shown in FIG. 4. Alternatively, optional heat stake 118 may be replaced with a screw through inner lens face 115 and into opaque material 125 to hold the two parts together.

FIGS. 6-11 show views of an exemplary vehicle ADB headlamp 200, which is an example of vehicle ADB headlamp 100 having an inner lens assembly 110 with an array of inner lenses arranged in a single plane. Items enumerated with like numerals from FIGS. 1-5 are the same or similar and their description may not be repeated accordingly. FIGS. 6-11 are best viewed together with the following description.

Figure 6:
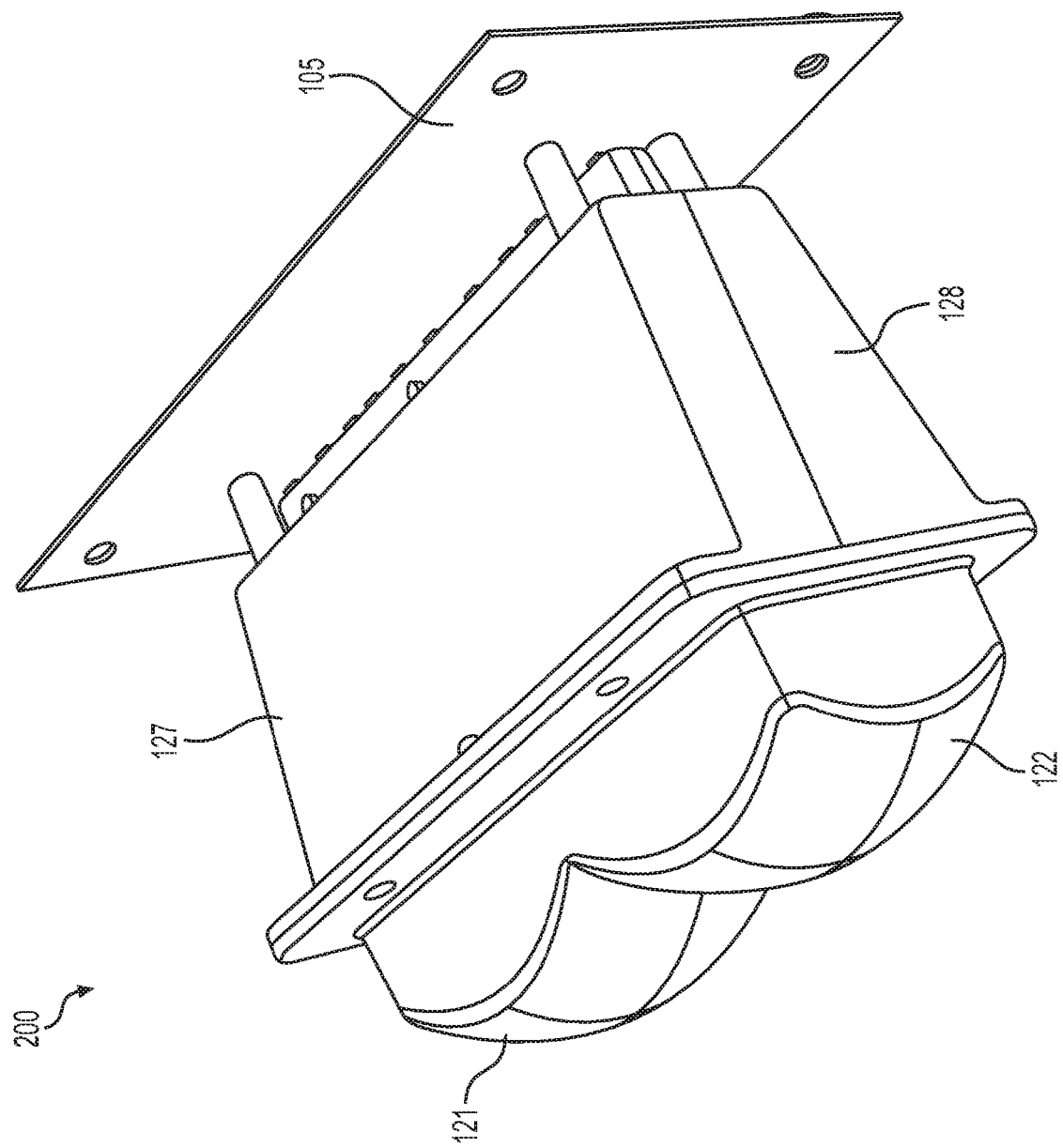
FIG. 6 is a front perspective view of a vehicle ADB headlamp, in an embodiment.

FIG. 6 is a front perspective view of vehicle ADB headlamp 200 showing the outer components, which include a first outer lens 121, a second outer lens 122, a first carrier 127, a second carrier 128, and PCB 105. First and second outer lenses 121, 122 are examples of outer lens 120 of FIGS. 1, 4, and 5. First carrier 127 and second carrier 128 are examples of structural components adapted to secure the inner lenses of inner lens assembly 110, as described below in connection with FIGS. 7-11. First and second carriers 127, 128 are for example molded plastic parts that are secured together and adapted to provide structural support between PCB 105, the inner lens assembly 110, and the outer lenses 121, 122.

Figure 7:
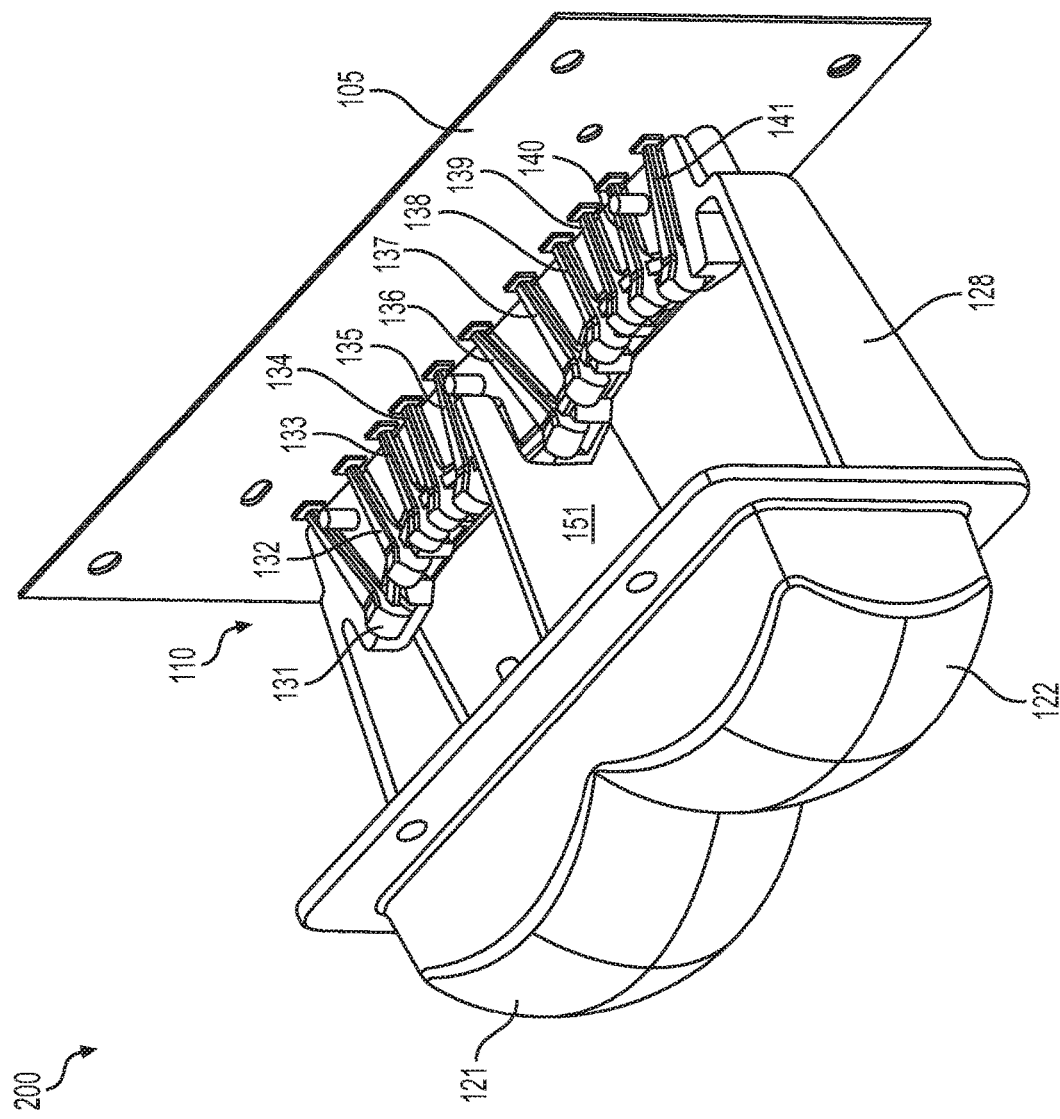
FIG. 7 shows the front perspective view of the vehicle ADB headlamp of FIG. 6 with some outer components removed to reveal internal components.

FIG. 7 shows vehicle ADB headlamp 200 with first carrier 127 removed to reveal internal components including inner lens assembly 110. As depicted in FIG. 7, inner lens assembly 110 has eleven inner lenses including first inner lens 131 up to eleventh inner lens 141. Inner lenses 131-135 are oriented for directing light to first outer lens 121. Likewise, inner lenses 136-141 are oriented for directing light to second outer lens 122. In certain embodiments, each inner lens 131-141 is targeted to the center of its respective outer lens 121, 122. For each of inner lenses 131-141, the focal point is located at the face exit surface of the inner lens in the center of the face exit surface. In certain embodiments, inner lenses 131-141 in headlamp 200 are adapted to collimate light vertically (e.g., in the up and down portion of the beam) from respective LEDs, and outer lenses 121, 122 collimate the light horizontally (e.g., in the cross-car direction). In some embodiments, inner lenses 131-141 are adapted to collimate light in the horizontal and/or vertical directions, and outer lenses 121, 122 are adapted to collimate light in the horizontal and/or vertical directions.

In some embodiments, one or more anti-reflection coatings may be added to the exit surfaces of the inner lenses 131-141 and/or the exit surfaces of first and second outer lenses 121, 122 to improve light control efficiency.

A baffle 151 is adapted to prevent light from inner lenses 131-135 from reaching second outer lens 122; similarly, baffle 151 prevents light from inner lenses 136-141 from reaching first outer lens 121. In other words, inner lens assembly 110 includes a first array of inner lenses 131-135 directed to first outer lens 121, which is separated from a second array of inner lenses 136-141 directed to second outer lens 122 via baffle 151.

Figure 8:
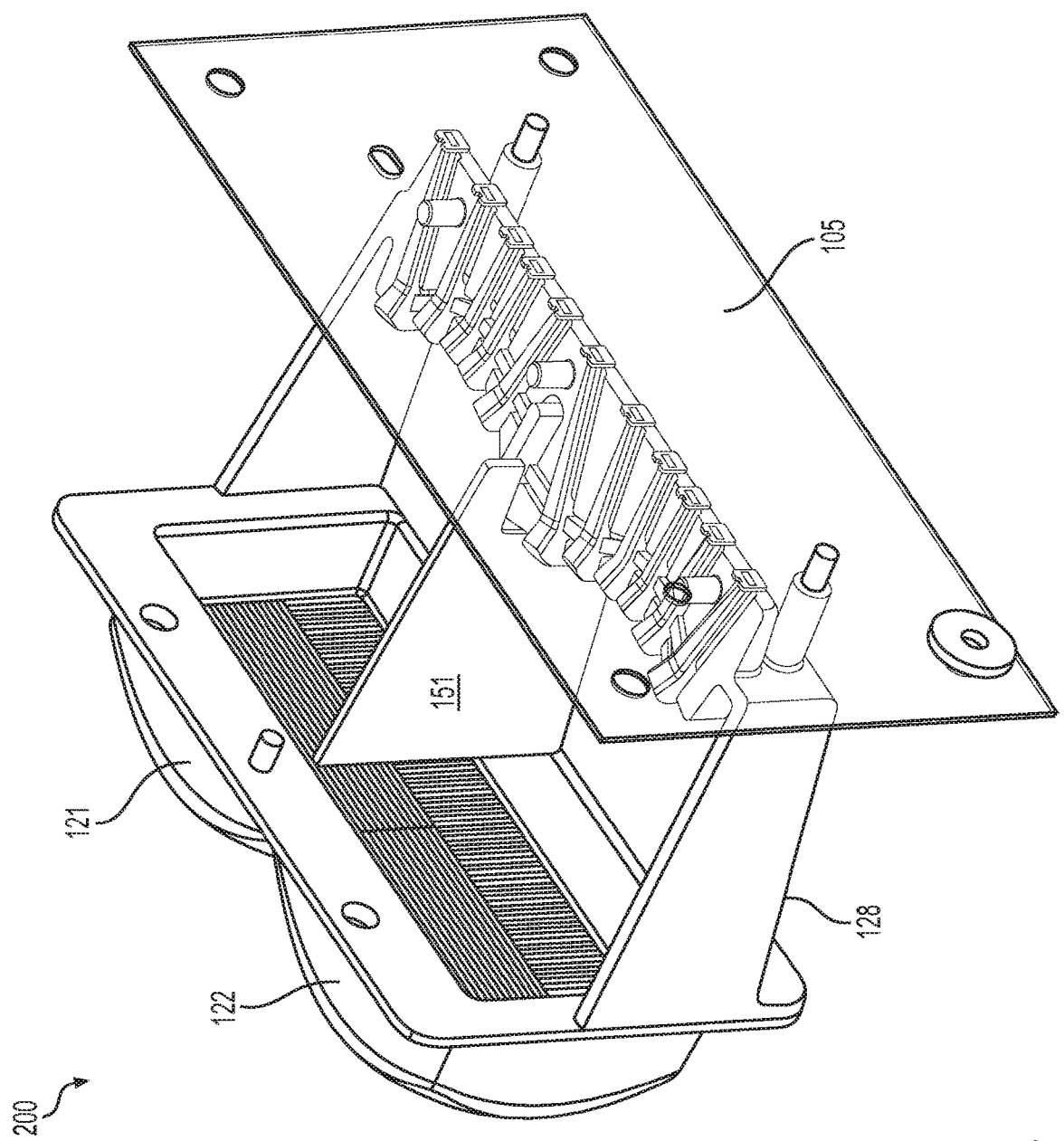
FIG. 8 is a rear perspective view of the vehicle ADB headlamp of FIG. 6 with some outer components removed to reveal internal components.

FIG. 8 is a rear perspective view of vehicle ADB headlamp 200 with first carrier 127 removed, and with PCB 105 rendered partially transparent, to reveal internal components. In certain embodiments, the interior surface (e.g., the B surface) of first and second outer lenses 121, 122 includes fine flutes that feather out the vertical beam emitted from inner lens assembly 110 in the horizontal and vertical directions.

Figure 9:
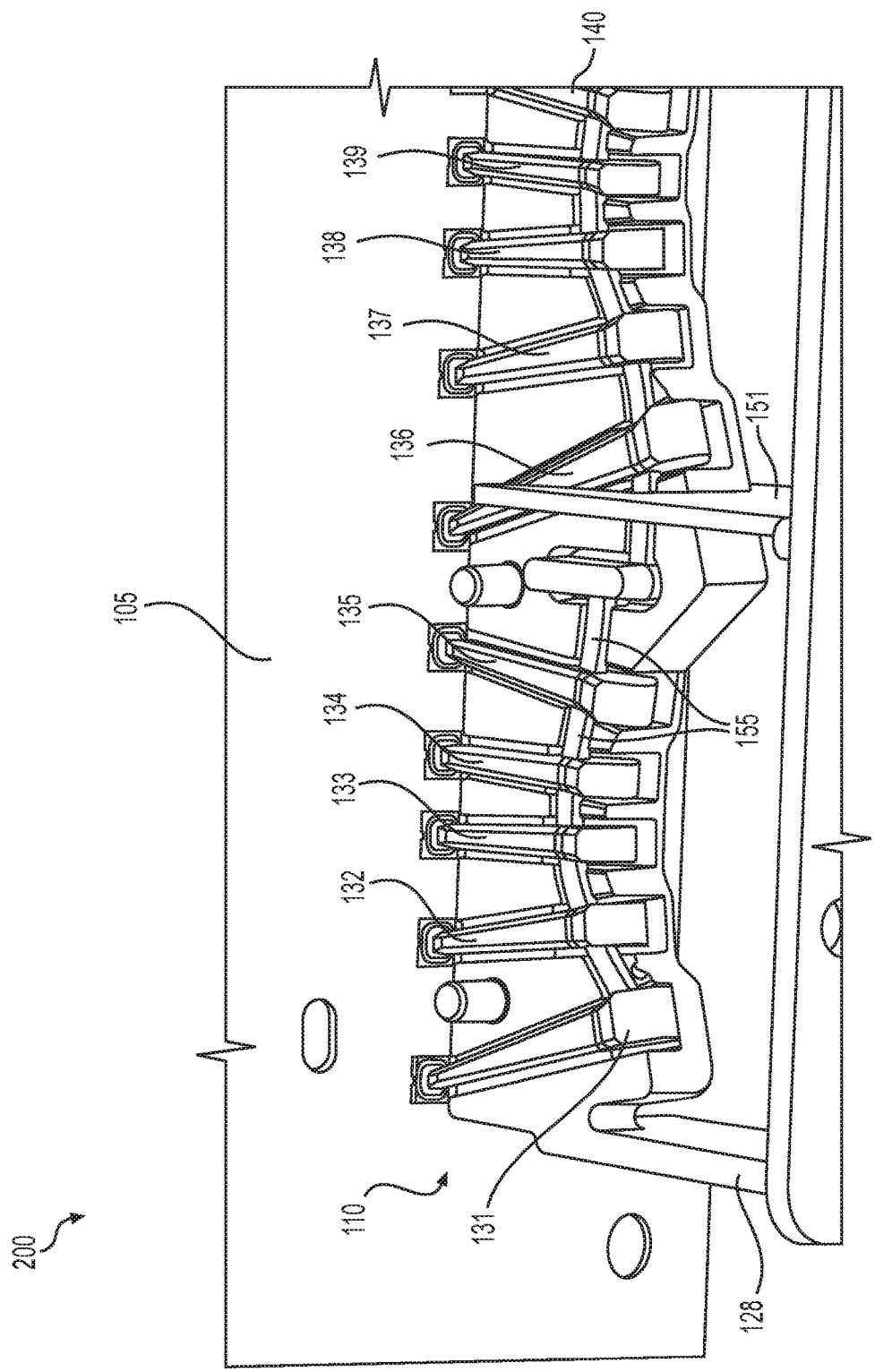
FIG. 9 is a close up view of some components of the vehicle ADB headlamp of FIG. 6.

FIG. 9 is a close up view of some components of vehicle ADB headlamp 200, which reveals slots in second carrier 128 that are each adapted to receive an individual inner lens of inner lens assembly 110. The slots are adapted to support each inner lens and to align each inner lens in a predetermined direction (e.g., at the center of a respective outer lens). First carrier 127 also includes slots for supporting each inner lens as best viewed in FIG. 11. In addition to providing mechanical support, the slots optically isolate each inner lens from one another, such that light from the side faces of the inner lenses is blocked and prevented from reaching a neighboring inner lens. In other words, first and second carriers 127, 128 provide an opaque material similar to opaque material 125 of FIGS. 4 and 5.

A cross-bar 155 mechanically couples each of the inner lenses 131-141 of inner lens assembly 110. This enables inner lens assembly 110 to be inserted during manufacture between first and second carriers 127, 128 as a single component as opposed to a plurality of individual inner lenses. As depicted in FIG. 9, the inner lenses 131-141 may include chamfers along their edges, lengthwise, to direct light down the inner lens from a respective LED. In some embodiments, chamfers on the forward side of each inner lens feather the beam and provide a sharp vertical segmentation without glare.

Figure 10:
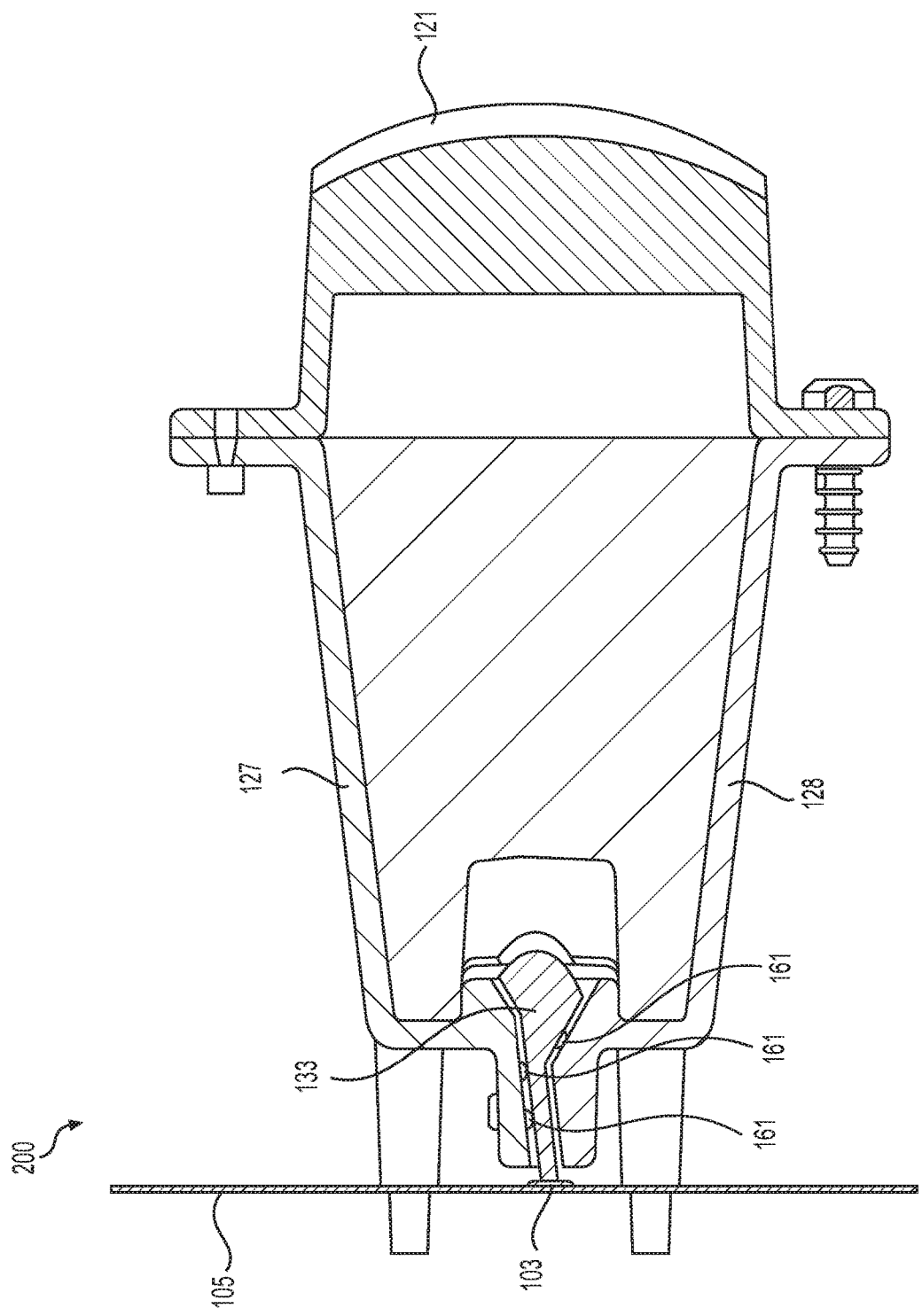
FIG. 10 is a cross-sectional side view of the vehicle ADB headlamp of FIG. 6.
Figure 11:
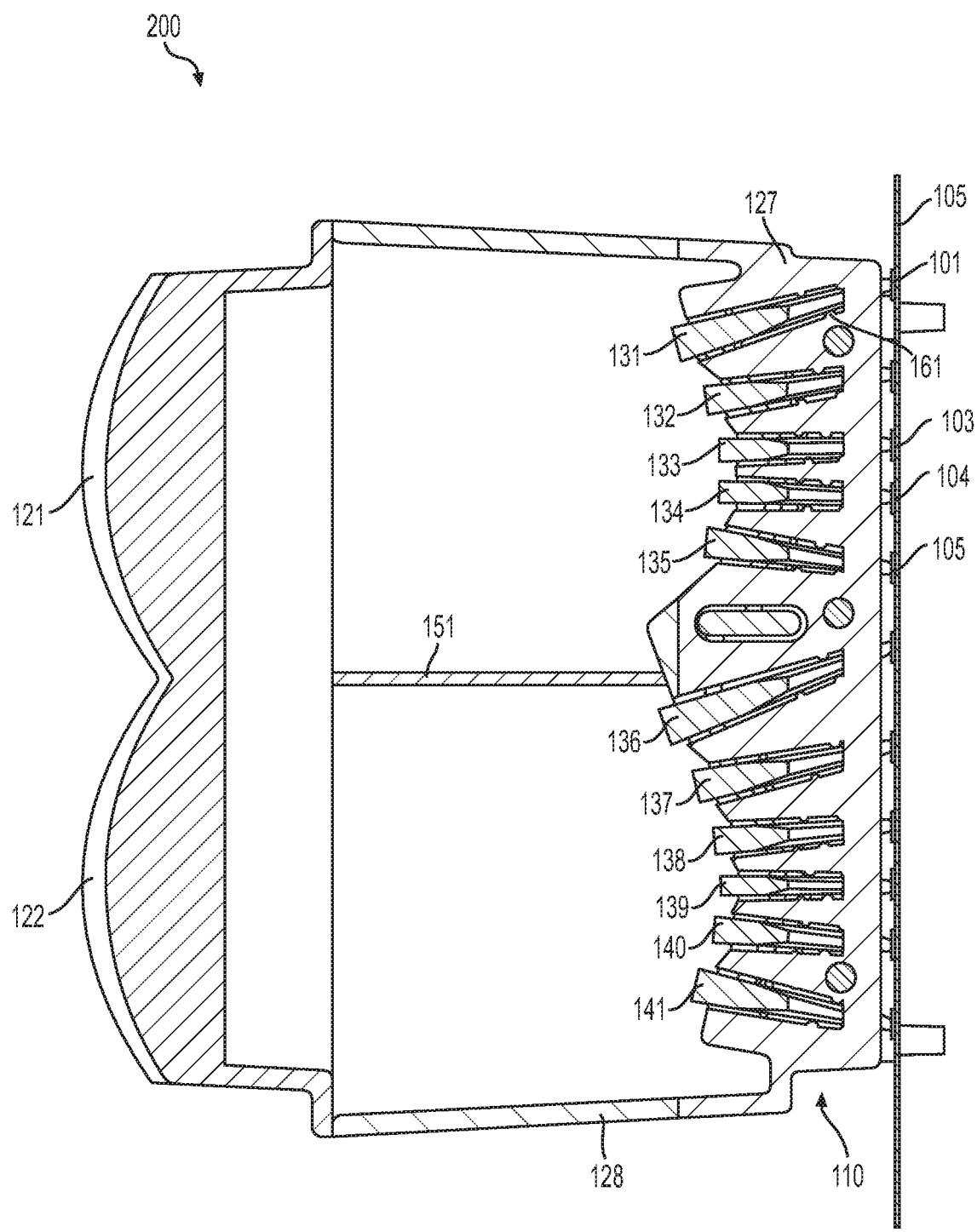
FIG. 11 is a top-down cross-sectional view the vehicle ADB headlamp of FIG. 6.

FIG. 10 is a cross-sectional side view of vehicle ADB headlamp 200 at third LED 103 and third inner lens 133. FIG. 11 is a top-down cross-sectional view of vehicle ADB headlamp 200 revealing inner lenses 131-141 of inner lens assembly 110, with first carrier 127 partially visible. FIGS. 10 and 11 are best viewed together with the following description. In certain embodiments, each slot of carriers 127, 128 contains an inner lens and includes one or more beads 161 adapted for positioning a respective inner lens. Not all beads are enumerated for clarity of illustration. As depicted in FIG. 11, bead 161 is illustrated in the slot surrounding first inner lens 131. First bead 161 is an example of a bump molded into first carrier 127 that extends into a slot for precisely positioning an inner lens. The bead constrains the position of inner lens 131 such that inner lens 131 is oriented in a predetermined direction (e.g., toward the center of first outer lens 121) and positioned over the center of the LED 101. The beads provide a single or small number of contacts for maintaining light efficiency and facilitating orientation of each inner lens. In certain embodiments, beads (not shown) are disposed along the sides of first outer lens 121 and/or second outer lens 122 for shaping beam projection (e.g., to prevent high beam glare).

In addition to glare reduction, the direction of light emitted from vehicle ADB headlamp 200 may be adaptively changed by turning of one or more LEDs. For example, while the vehicle is turning, the controller may determine that the vehicle is turning and by how much (e.g., via rotation sensors at the steering column) and turn on LEDs directed towards the direction of the turn. At the same time, the controller may turn off or dim LEDs directed away from the direction of the turn. This enables the beam pattern to swivel without requiring any moveable components or a motor. In certain embodiments, a hot spot of the beam moves in coordination with turning of the vehicle.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A vehicle adaptable-driving-beam headlamp, comprising:
    an inner lens assembly having a plurality of discrete sub-lenses for shaping light;
    a plurality of light-emitting diodes (LEDs), wherein each one of the plurality of LEDs is aligned with a respective discrete sub-lens of the inner lens assembly;
    a controller adapted for dimming the one or more LEDs for selectively dimming portions of the vehicle adaptable-driving-beam headlamp;
    wherein the inner lens assembly comprises a matrix of discrete sub-lenses having light input surfaces arranged in a single plane;
    wherein the matrix of discrete sub-lenses comprises a first array of discrete sub-lenses and a second array of discrete sub-lenses both having all input surfaces arranged in the single plane, with the first array located adjacent the second array;
    wherein the first array of discrete sub-lenses is aligned towards the center of a first projection lens, and the second array of discrete sub-lenses is aligned towards the center of a second projection lens, located adjacent the first projection lens; and
    wherein the first array of discrete sub-lenses has light emission surfaces having first curvature arranged along a focus curve of the first projection lens for centrally focusing a first portion of the beam pattern, and the second array of discrete sub-lenses has a second curvature arranged along a focus curve of the second projection lens for centrally focusing a second portion of the beam pattern wherein a pitch of each discrete sub-lens of the inner lens assembly is adapted such that a narrower pitch in the central region of the inner lens assembly provides a higher intensity and increased resolution in the central portion of the beam pattern, and a broader pitch in the peripheral regions of the inner lens assembly provides a lower intensity and a coarser resolution in the peripheral portions of the beam pattern; and
    wherein the first array of discrete sub-lenses includes a first array of slots in an opaque material configured to optically isolate each discrete sub-lens such that light from side faces of each discrete sub-lens is prevented from reaching a neighboring discrete sub-lens in the first array, and the second array of discrete sub-lenses includes a second array of slots in an opaque material configured to optically isolate each discrete sub-lens such that light from side faces of each discrete sub-lens is prevented from reaching a neighboring discrete sub-lens in the second array.

2. The vehicle adaptable-driving-beam headlamp of claim 1, wherein each discrete sub-lens of the inner lens assembly is a finger-type lens that comprises:
    a narrow end for receiving light via a coupling surface from a corresponding one of the plurality of LEDs; and
    a broad end, opposite the narrow end, the broad end adapted to provide an exit face for emitting light.

3. The vehicle adaptable-driving-beam headlamp of claim 1, wherein each discrete sub-lens of the inner lens assembly is adapted for collimating light in a first direction and/or a second direction.

4. The vehicle adaptable-driving-beam headlamp of claim 1, wherein one or more discrete sub-lenses of the inner lens assembly is illuminated by one or more respective LEDs to provide a combined light output that forms a single beam pattern spot.

5. The vehicle adaptable-driving-beam headlamp of claim 1, wherein each discrete sub-lens comprises a coupling surface that receives light emitted from each corresponding LED, the coupling surface being larger than a light emitting surface of each corresponding LED.

6. The vehicle adaptable-driving-beam headlamp of claim 1, wherein the beam pattern is adaptively changed while a vehicle is turning by illuminating LEDs directed towards a vehicle's turning direction, and at the same time dimming one or more LEDs directed away from the vehicle's turning direction, thereby enabling the beam pattern to shift without requiring any moveable components or a motor in the headlamp.

7. The vehicle adaptable-driving-beam headlamp of claim 1, further comprising an opaque material surrounding each of the discrete sub-lenses of the inner lens assembly to prevent internal light transfer between each lens of the inner lens assembly.

8. The vehicle adaptable-driving-beam headlamp of claim 7, wherein the opaque material comprises a latch adapted to extend over an inner face of the inner lens assembly and a heat stake adapted to extend through a gap in the inner face for securing the opaque material with the inner lens assembly.

9. The vehicle adaptable-driving-beam headlamp of claim 7, wherein the opaque material and the inner lens assembly are formed using a two-shot injection molding process such that the opaque material and the inner lens assembly are held together without additional mechanisms.

10. The vehicle adaptable-driving-beam headlamp of claim 1, wherein the first projection lens generates a first collective undivided image, and the second projection lens generates a second collective undivided image.

11. The vehicle adaptable-driving-beam headlamp of claim 1, further comprising a camera system for imaging a forward view and a controller for determining a target location based on camera images such that the controller determines which LEDs to modulate or turn off in real-time or near real-time based on the camera images.

12. The vehicle adaptable-driving-beam headlamp of claim 11, wherein the controller dims certain LEDs using pulse-width modulation based on the target location.

13. The vehicle adaptable-driving-beam headlamp of claim 1, wherein exit surfaces of the discrete sub-lenses, the first projection lens, and the second projection lens include an anti-reflection coating to improve light control efficiency.

14. The vehicle adaptable-driving-beam headlamp of claim 1, further comprising:
a baffle disposed within the headlamp for separating the first array of discrete sub-lenses from the second array of discrete sub-lenses;
and
the baffle prevents cross-talk of light between the first array of discrete sub-lenses and the second projection lens, and the baffle prevents cross-talk of light between the second array of discrete sub-lenses and the first projection lens.

* * * * *